July 11, 1950 S. M. BELESKAS 2,515,030
WAVE GENERATION AND CONTROL
Filed Oct. 31, 1945 3 Sheets-Sheet 1

INVENTOR.
STANLEY M. BELESKAS
BY
H. S. Grover
ATTORNEY

July 11, 1950     S. M. BELESKAS     2,515,030
WAVE GENERATION AND CONTROL

Filed Oct. 31, 1945     3 Sheets-Sheet 2

INVENTOR.
STANLEY M. BELESKAS
BY
ATTORNEY

Patented July 11, 1950

2,515,030

UNITED STATES PATENT OFFICE 2,515,030

WAVE GENERATION AND CONTROL

Stanley M. Beleskas, Oaklyn, N. J., assignor to Radio Corporation of America, a corporation of Delaware Application October 31, 1945, Serial No. 625,889

9 Claims. (Cl. 332—26)

This application concerns an improved wave generating, wave frequency stabilizing and wave frequency controlling system.

An object of my invention is the generation of stabilized oscillatory energy, the stabilized frequency of which may be varied over a wide frequency range and the amplitude or intensity of which is substantially constant throughout the range of operation.

An additional object of my invention is oscillation generation as described in the preceding paragraph with improved control of the frequency thereof in accordance with control potentials or modulating potentials.

The manner in which the above objects and additional objects are attained will be apparent in the detailed description which follows. In this description reference will be made to the attached drawings, wherein Fig. 1 illustrates by circuit diagram the essential features of a stabilized oscillation generator arranged in accordance with my invention.

A feature of this embodiment is a variable reactance incorporated therein by means of which the frequency of the stabilized generated oscillations may be varied through a wide range and yet remain of substantially constant amplitude and of substantially constant mean frequency.

Figure 1:
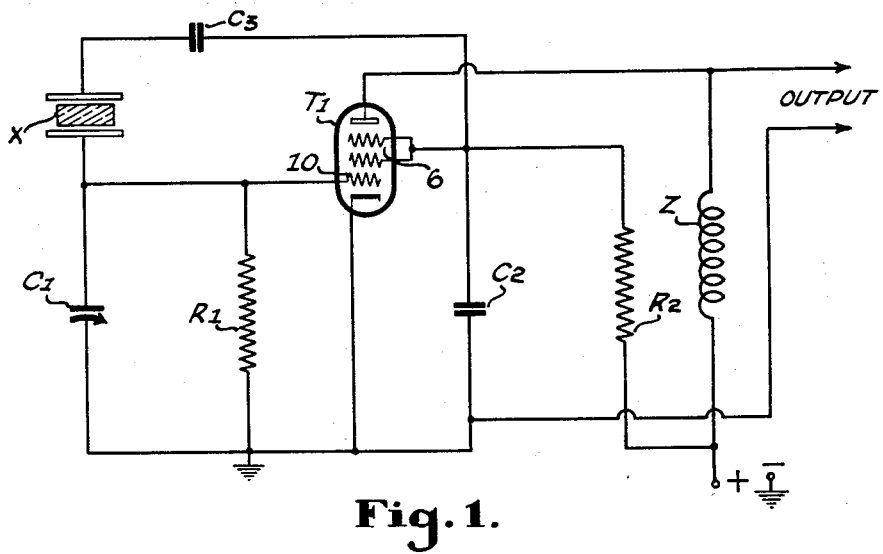
Fig. 1a is a curve illustrating the operation of the generator of Fig. 1, and in particular the relation between frequency change of the generated wave and changes in the reactance causing the said frequency change.

In Fig. 1, tube or electron control device T1 has its screening electrode or equivalent electrode 6 regeneratively coupled by a coupling condenser C3 and a crystal X to the control electrode or grid 10. The grid electrode 6 is coupled to the cathode or electron-emitting electrode by condenser C2, while the grid electrode 10 is coupled to the cathode by a variable condenser C1. Resistance R1 supplies direct current biasing potential to the control grid 10, resistance R2 supplies positive potential to the grid 6 and the tube output impedance Z supplies positive potential to the anode of the tube.

Oscillations are generated in the circuits including crystal X, condensers C1 and C2, and electrodes 6 and 10, by virtue of the regenerative coupling from the electrode 6 serving as the generator anode or electron-receiving electrode through the crystal to the control grid 10. The generated voltages are of substantially constant frequency because of the stabilizing effect of the crystal X which to a large extent determines the frequency of operation. The generated oscillations are electron coupled through the tube to the plate and are supplied at the output leads.

If a capacitor C2, which may be fixed, is connected between screen and cathode and a variable capacitor C1 is connected between grid 10 and cathode, the frequency of the oscillations generated can be varied over a very wide range without upsetting the stability of the oscillator. The output stays substantially constant throughout the entire range of variation. Similar results are obtained if C1 is fixed and C2 is varied. Operation and comparison has shown that by using the improved means of my invention the frequency generated may be varied as much as two times more than any other system used, without changing the stability of the oscillator. As the frequency of operation is increased the range of variation is increased. At higher frequencies the range of variation is more than twice as great as can be obtained in other systems without reducing the stability. The generated oscillations are stabilized in the usual manner by the crystal X.

Other systems which employ a variable capacitor across the crystal or have a variable air gap on the crystal cannot vary the frequency more than .01%. At this variation the oscillators known heretofore usually stop oscillating or become unstable with a reduced output. In my improved generator variations in the frequency of the generated oscillations of .025% were obtained.

Figure 1A:
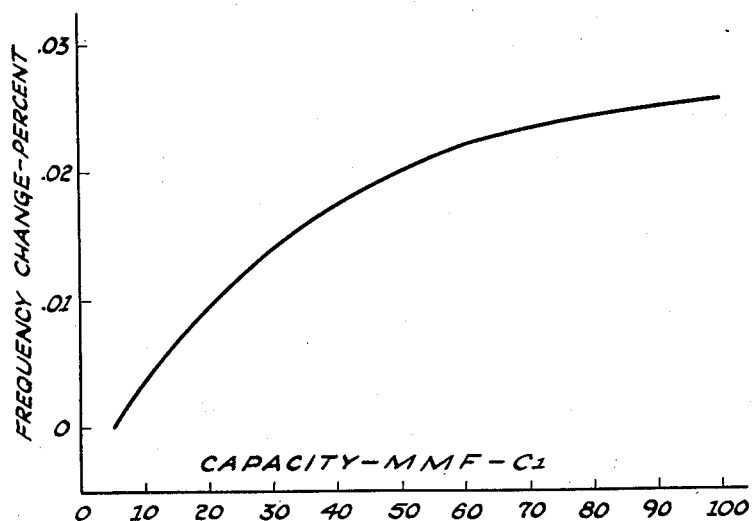

In Fig. 1a I have illustrated graphically the frequency change of the generated oscillations in percent plotted as ordinates against the capacity change at C1 (abscissae) necessary or required to produce the frequency change.

In an embodiment which proved entirely successful the tube T1 is a type 6SJ7

$C1 = 0$–$100$ mmf.
$C2 = 100$ mmf.
$C3 = 390$ mmf.
$R1 = 330{,}000$ ohms
$R2 = 82{,}000$ ohms and the crystal frequencies used were within these frequencies $= 800$ kc. to $2333$ kc.

As stated above by varying C1 stabilized oscillations of a wide range of frequencies may be developed and supplied electronically to the output circuit.

Figure 2:
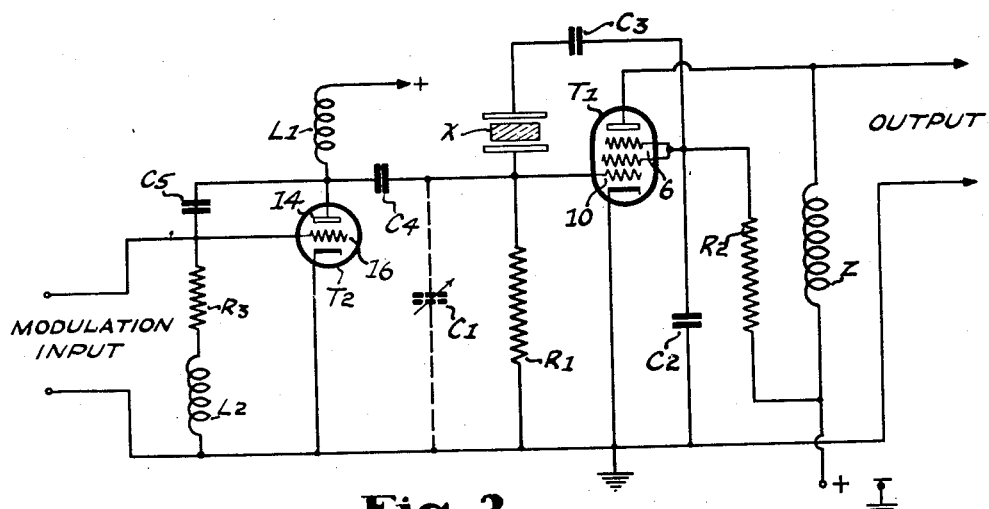
Fig. 2 illustrates by circuit diagram the essential features of my improved stabilized wave generator of Fig. 1, incorporated with an improved variable reactance which itself may be controlled by control potentials or signals to control or modulate the timing of the generated oscillations.

In Fig. 2 I have shown a variable reactance C1 which may be adjusted to change the frequency of the oscillations generated or may be controlled by control potentials to change the frequency of the oscillations generated in accordance with control potentials or the reactance may be modulated in accordance with signals to modulate the timing of the oscillations generated.

In Fig. 2, C1, shown dotted, is mainly made up of the reactance between the anode and cathode of a reactance tube or electron discharge device T2 having its anode 14 coupled by coupling and direct current blocking condenser C4 to the control grid 10 of tube T1 and its cathode coupled to the cathode of tube T1. The anode of T2 is coupled to a direct current source by inductance L1. The control grid 16 of tube T2 is coupled by a phase shifting, coupling and direct current potential blocking condenser C5 to the anode of tube T2 so that oscillations of the generated frequency are supplied from the oscillatory circuit, at one terminal of the crystal X, to the control grid 16. The control grid 16 is coupled to the cathode of tube T2 by a phase shifting resistance R3 and inductance L2.

The condenser C5, resistance R3 and inductance L2 form a phase shifting network the purpose of which is to apply to the control grid 16 a voltage of the generated frequency which leads the voltage of the generated frequency on the anode 14 by about 90° so that the current through the tube leads the current in the oscillation generator and the tube T2 simulates a capacitive reactance. If the impedance of capacitor C5 is made high as compared to the resistance of the resistor R3 then the alternating current through the circuit and in particular through the resistance R3 will lead the voltage of the generated frequency applied across the network, that is, across the anode and cathode of tube T2 by about 90°.

Since the current through R3 leads the applied voltage by about 90° the voltage on the control grid 16 at the generated frequency leads the anode voltage by the same amount, so that current through the tube is advanced in phase about 90° with respect to the anode voltage. If the current through the network does not lead the voltage thereacross by 90° the desired 90° relation between the anode voltage and tube current is not obtained. To obtain an exact 90° phase displacement of the grid voltage an inductance L2 is introduced to provide a voltage component which lags or opposes the voltage component across C5 by an amount such that the voltage drop across R3 can be made exactly 90° with respect to the applied voltage, or more than 90°, or less than 90°.

Figure 2A:
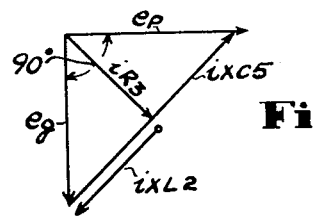
Fig. 2a is a vector diagram showing the relation of voltages appearing in the controllable reactance of Fig. 2.

In a particular application to provide an exact 90° phase shift the impedance of L2 is made to equal the resistance of R3 and both equal ½ the impedance of C5. The vector relation then would be as shown in Fig. 2a, wherein $ep$ is the voltage from the plate 14 to ground, $eg$ is the voltage between the grid 16 and ground, $iR3$ is the drop through R3, $ixL2$ is the drop through L2, and $ixC5$ is the drop across C5. C3 and C4 are only blocking condensers.

In any event, the tube T2 simulates a reactance the size of which depends upon the intensity of the current through the tube and which reactance is capacitive in character. This will provide in the tube T2 a reactive effect capacitive in nature and this effect, as stated above, is utilized as the variable capacity C1 of the oscillator. By varying the potential of grid 16 the out-of-phase current in the tube T2 supplied to the anode 14 is varied, thereby varying the size of the simulated capacity between the output electrodes of tube T2. This varies the frequency of the oscillations generated, as stated above in detail in connection with Fig. 1.

If the potential applied to 16 is changed the frequency of the oscillations generated changes. Control potentials of any nature, such as, for example, potentials derived for automatic frequency control purposes or modulating potentials, may be applied to the control grid 16.

Returning now to the generator of Fig. 1, the frequency of operation may be changed by changing the value of C1 or by varying the value of C2. In Fig. 2, I have shown a capacity C1 which is variable and a fixed capacity C2.

Figure 3:
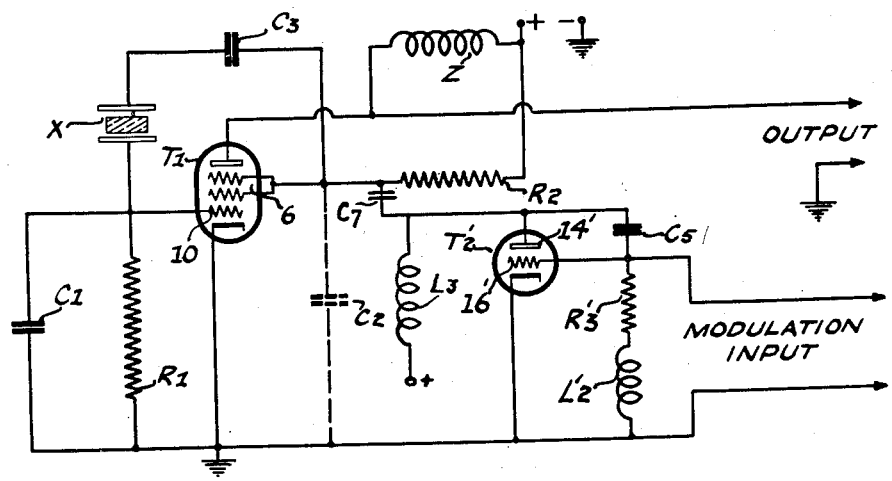
Figs. 3 and 4 illustrate modifications of the embodiment illustrated in Fig. 1.

In the embodiment of Fig. 3, I have shown the capacity C1 as being fixed and the capacity C2 as being variable. Moreover, in this figure the capacity C2 comprises the tube reactance T'2. The operation of the arrangement in Fig. 3, it is believed, is self-evident from the foregoing description, and from the drawings, wherein similar reference characters primed have been used in the reactance tube circuit. In the arrangement of Fig. 3, the tube T'2 again has its control grid 16' excited by oscillations of the generated frequency advanced in phase 90° with respect to the oscillations of the generated frequency on the anode 14' of the reactance tube and on the screening electrode 6 of the generator tube. The current in the tube T'2 to the anode leads the anode voltage by 90° and the tube T'2 simulates a capacity connected between the oscillator anode 6 and the cathode of the oscillator.

By changing the potential on the control grid 16' the current through the tube is changed, thereby changing the value of the simulated capacity. The control potential may be changed as desired to change the frequency of operation of the generator as described in connection with Fig. 2.

Figure 4:
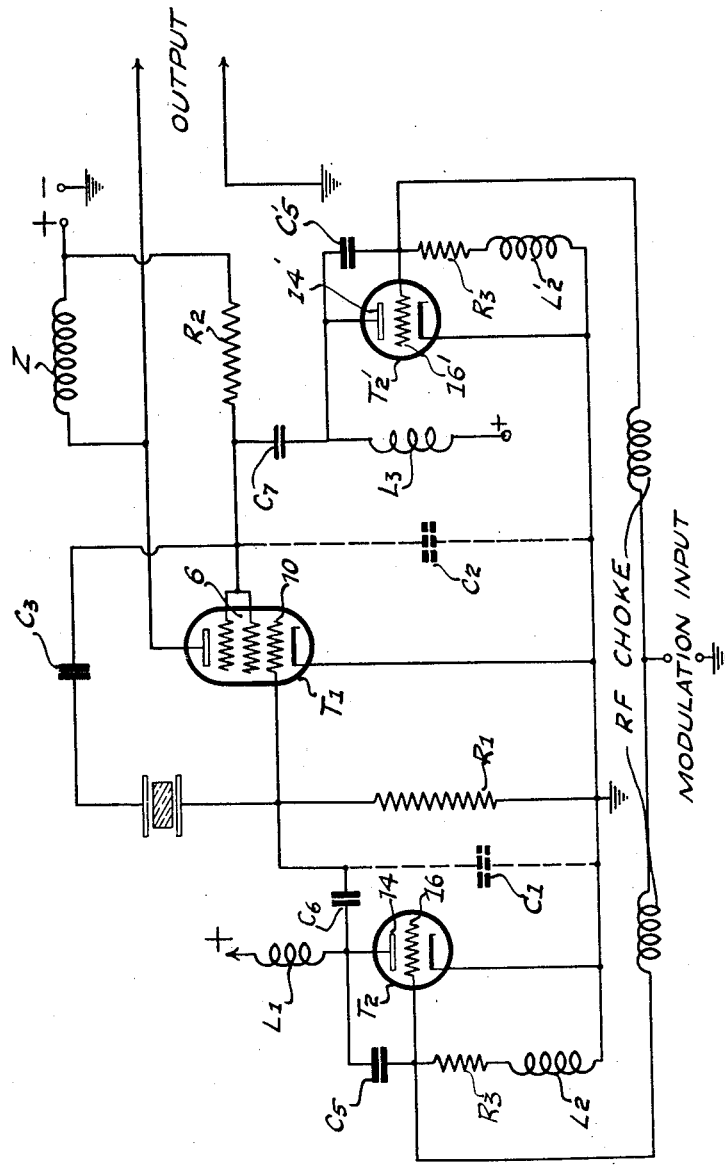

In the embodiment of Fig. 4, I have shown two simulated reactances comprising tubes T2 and T'2. In this embodiment the tube T2 is arranged as in Fig. 2, to provide a simulated capacity equivalent to the capacity C1 in Fig. 1. The tube T'2 is arranged as in Fig. 3, to provide a simulated reactance equivalent to the reactance C2 of Fig. 3. The individual reactance tubes operate as in Figs. 2 and 3. As to their combined effect note that the anodes of tubes T2 and T'2 operate at opposed radio frequency voltages, and in each reactance tube a reactive effect is produced. Moreover, the tube reactive effects must increase and decrease together. Control or modulation is accordingly applied in like phase to the tubes T2 and T'2.

What is claimed is:

1. In a wave generating circuit to be used with an electron control device having oscillation generating electrodes including an electron-emitting electrode, an electron-receiving electrode and a control electrode, a piezoelectric crystal regeneratively coupled substantially directly between said receiving electrode and said control electrode, a frequency-determining capacitor connecting said control electrode substantially directly to said emitting electrode, a frequency-determining capacitor connecting said receiving electrode substantially directly to said emitting electrode, the capacitance of at least one of said capacitors being variable in response to signals, means for applying direct operating potentials to the electrodes of said device, whereby sustained oscillations are generated, and signal-responsive means for varying the effective capacitance of said one capacitor to frequency modulate the oscillations generated.

2. A wave generating circuit according to claim 1, wherein said one capacitor is the capacitor connecting the control electrode to the emitting electrode.

3. A wave generating circuit according to claim 1, wherein said one capacitor is the capacitor connecting the receiving electrode to the emitting electrode.

4. A wave generating circuit according to claim 1, wherein the capacitances of both capacitors are variable in response to signals and including signal-responsive means for varying the effective capacitances of both capacitors.

5. In a wave generating circuit to be used with an electron control device having oscillation generating electrodes including an electron-emitting electrode, and electron-receiving electrode and a control electrode, a piezoelectric crystal regeneratively coupled substantially directly between said receiving electrode and said control electrode, a frequency-determining capacitor connecting said control electrode substantially directly to said emitting electrode, a frequency-determining capacitor connecting said receiving electrode substantially directly to said emitting electrode, at least one of said capacitors being comprised of the reactive effect produced between the output electrodes of an electron discharge device with connections arranged for applying oscillatory energy in phase displaced relation to an output electrode and control electrode of said discharge device, means for applying direct operating potentials to the electrodes of said control device, whereby sustained oscillations are generated, and means for varying the current through said discharge device to vary the effective capacitance of said one capacitor to frequency modulate the oscillations generated.

6. A wave generating circuit according to claim 5, wherein said one capacitor is the capacitor connecting the control electrode to the emitting electrode of the control device.

7. A wave generating circuit according to claim 5, wherein said one capacitor is the capacitor connecting the receiving electrode to the emitting electrode of the control device.

8. A wave generating circuit according to claim 5, wherein both capacitors are comprised of the reactive effects produced between the output electrodes of separate electron discharge devices and including means for varying the currents through both discharge devices to vary the effective capacitances of both capacitors.

9. A wave generating circuit according to claim 5, wherein said crystal is connected in series with a condenser directly between the receiving electrode and the control electrode of the control device.

STANLEY M. BELESKAS.

REFERENCES CITED

The following references are of record in the file of this patent:

UNITED STATES PATENTS

| Number | Name | Date |
| --- | --- | --- |
| 1,931,530 | Dow | Oct. 25, 1933 |
| 2,044,137 | Tunick | June 16, 1936 |
| 2,066,027 | Braaten | Dec. 29, 1936 |
| 2,133,648 | Pierce | Oct. 18, 1938 |
| 2,298,438 | Usselman | Oct. 10, 1942 |
| 2,312,079 | Crosby | Feb. 23, 1943 |
| 2,349,811 | Crosby | May 30, 1944 |
| 2,402,148 | Crosby | June 18, 1946 |